United States Patent [19]

Lin

[11] Patent Number: 4,998,686

[45] Date of Patent: * Mar. 12, 1991

[54] MECHANICAL STRUCTURE FOR VIDEO TAPE REWINDER

[76] Inventor: Long-Jing Lin, No. 53, Yih Yeong Road, 80257 Lin Yu Dist, Kaohsiung City, Taiwan

[*] Notice: The portion of the term of this patent subsequent to Jul. 18, 2006 has been disclaimed.

[21] Appl. No.: 423,379

[22] Filed: Oct. 19, 1989

[51] Int. Cl.$^5$ .......................... G03B 1/04; G11B 15/32
[52] U.S. Cl. .................................... 242/186; 242/201; 360/96.3
[58] Field of Search ............... 242/186, 198, 200, 201; 360/96.3, 96.5, 96.1

[56] References Cited

U.S. PATENT DOCUMENTS

| 3,608,895 | 9/1971 | Kozu et al. | 242/186 |
| 4,202,513 | 5/1988 | Osanai | 242/201 X |
| 4,301,483 | 11/1981 | Santoro | 360/96.3 |
| 4,848,699 | 7/1989 | Jing-Lin | 360/965 X |

Primary Examiner—Daniel P. Stodola
Assistant Examiner—Paul Thomas Bowen
Attorney, Agent, or Firm—Kirschstein, Ottinger, Israel & Schiffmiller

[57] ABSTRACT

A mechanical structure for video tape rewinder comprising a movable base, a main winding head, a motor, a cylindrical combining base for setting the motor in, two gear wheels engaging with the shaft gear of the motor and a gear wheel in the main winding head respectively. The movable base is provided with a hole at the right end and for a positioning post to go through for supporting the main winding head, and other two positioning posts fixed upright thereon for supporting the two gear wheels. The combining base extends upward at the left end of the movable base as a unit. The movable base can move sidewise with the left positioning post as a pivot so as to move the case opening arm also sidewise so that the tape case can be opened and the power cut off automatically.

5 Claims, 3 Drawing Sheets

MECHANICAL STRUCTURE FOR VIDEO TAPE REWINDER

BACKGROUND OF THE INVENTION

This invention has been devised to improve U.S.L.P. No. 4,848,699, which has been found to have the drawbacks in its mechanical structure listed below.

1. The gear disc 32 engages the shaft of the motor at a 90° angle for transmitting power along a point and a face so that the gear disc 32 may become loose and unstable, emitting comparatively large noise with resultant inferior stability in power transmission.

2. The gear disc 32 easily becomes so loose that tape rewinding or starting cannot be performed as expected.

3. The service life may be shortened because of the quick wear and tear of the parts caused by unstable performance in the power transimission.

SUMMARY OF THE INVENTION

This mechanical structure for video tape rewinder in accordance with the present invention has the object to get rid of the shortcomings mentioned above as much as possible.

The mechanical structure according to this invention comprises a rectangular movable base, a main winding head, a motor, two gear wheels, and a combining base.

The movable base is provided with a hole at the right end for a positioning post to go upward for supporting the main winding head, two positioning posts set upright on the upper surface properly spaced apart for supporting two gear wheels respectively.

The combining base of a cylindrical shape is provided for setting the motor therein, extending upward at the left end of the movable base as a unit to move together and comprising more than one propping post on the inner lower wall to prop up the motor and more than one hooking arm extending upward from the upper edge for hooking down and stabilizing the motor.

The two gear wheels are supported by the two, a left and a central, positioning posts; the gear wheel supported by the left positioning post engages with the gear on the shaft of the motor and the double gear wheel supported by the central post has two gear wheels of different diameter put together for engaging with the gear wheel on the left post and with a gear wheel in the main winding head. Therefore, the revolution of the motor can be transmitted through those gear wheels to turn around the main winding head.

When the tape has been finished in rewinding and the main winding head is stopped, the motor is still rotating to make the double gear wheel to turn a little along the gear wheel in the main winding head so that the movable base can be moved sidewise with the left positioning post as a pivot, and consequently the case opening arm, whose left end is kept in contact with the left end of the movable base, can be moved also sidewise to open the tape case and to cut off the electric power at the same time to stop the motor.

DETAILED DESCRIPTION OF THE INVENTION

Figure 1:
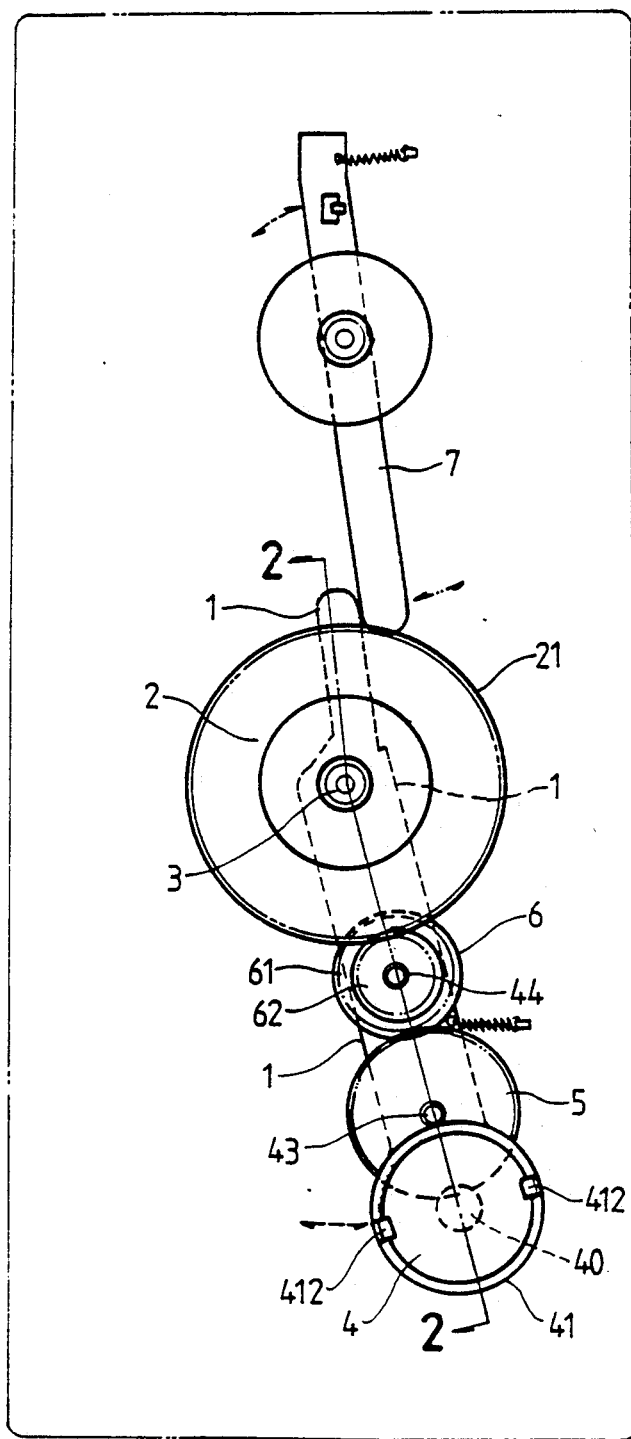
FIG. 1 is an upside view of the mechanical structure for video tape rewinder in accordance with the present invention.

The mechanical structure according to this invention comprises a movable base 1, a main winding head 2, a positioning post 3, a motor 4, a gear wheel 5, a double gear wheel 6 and a case opening arm 7.

Figure 2:
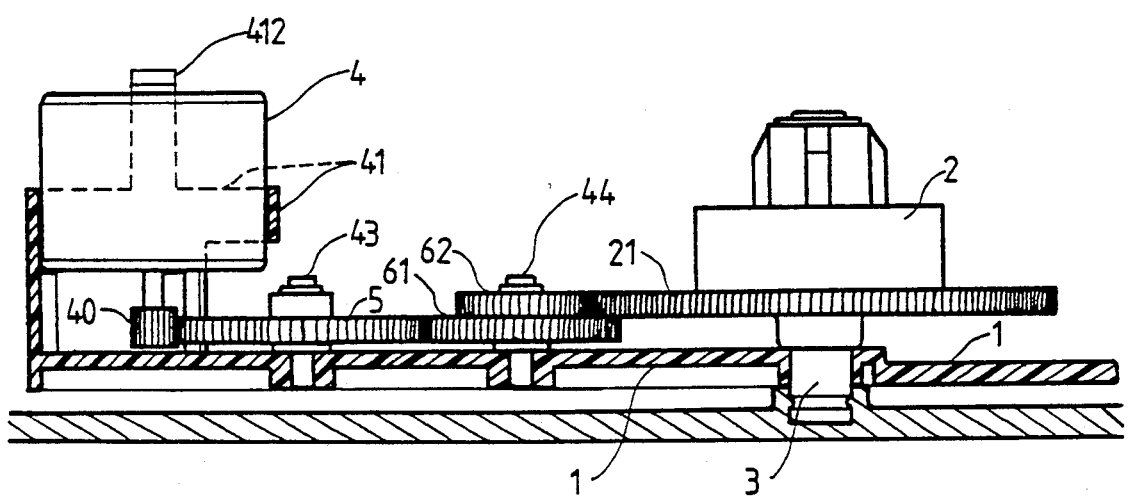
FIG. 2 is a cross-sectional view taken on line 2—2 on FIG. 1.
Figure 3:
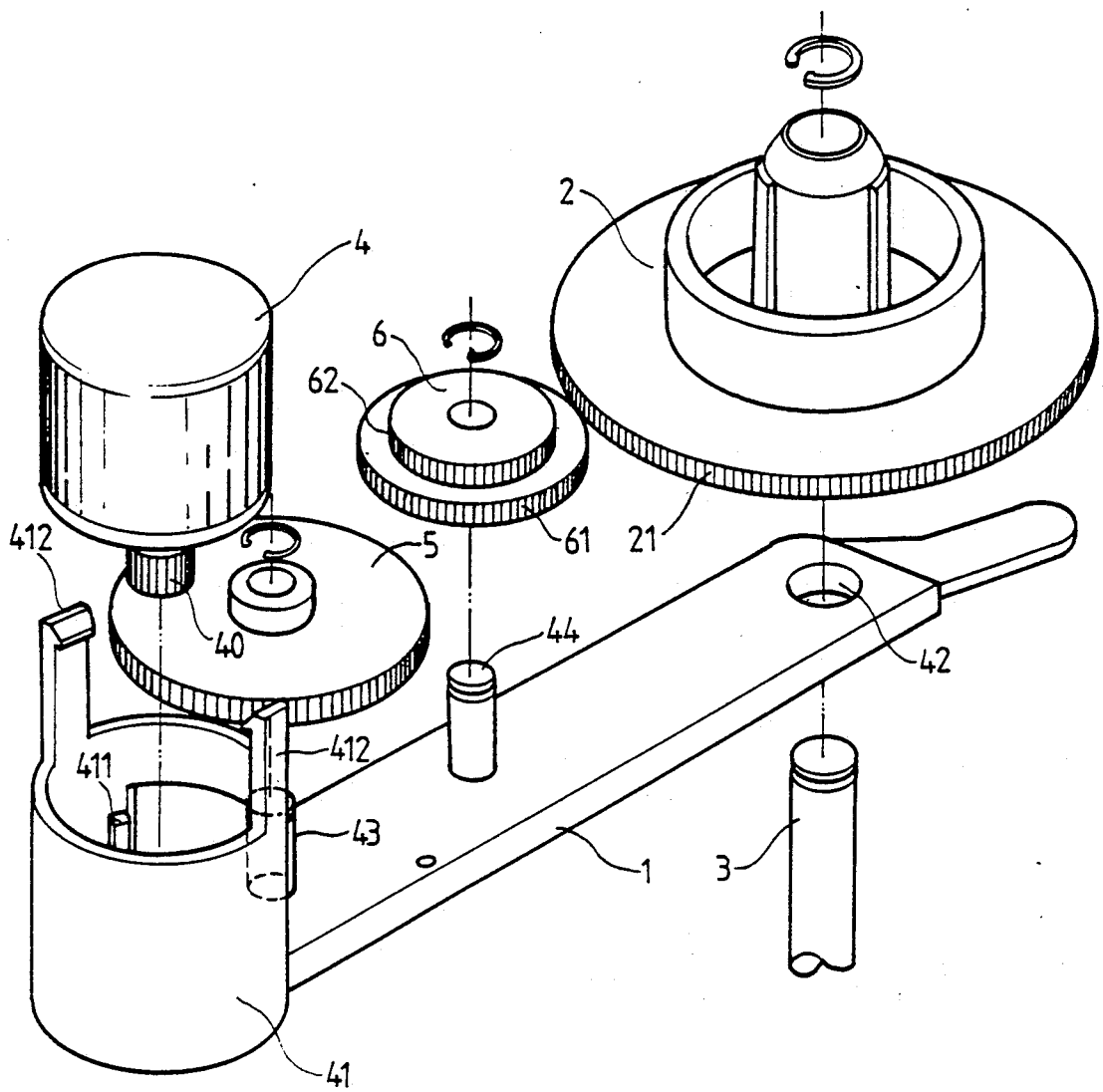
FIG. 3 is an exploded perspective view of the mechanical structure for video tape rewinder in accordance with the present invention.

The movable base 1 is shaped as rectangular, provided with a post hole 42 at the right end for the positioning post 3 to go through upward to support the main winding head 2 such that the movable base 1 can move sidewise. The left end of the movable base 1 forms a combining base 41 of a cylindrical shape for setting the motor 4 therein in the perpendicular position. Other two positioning posts 43 and 44 are provided fixed upright properly spaced apart on the movable base 1 between the post hole 42 and the combining base 41. The positioning post 43 set near the motor 4 supports the gear wheel 5 such that the gear wheel 5 can engage with a gear 40 fixed on the shaft of the motor. The positioning post 44 supports the double gear wheel 6 comprising two gear wheels 61, 62 of different diameter such that the gear wheel 62 engages with a gear wheel 21 in the main winding head 2 and the gear wheel 61 with the gear wheel 5 as shown in FIG. 2.

The combining base 41 is shaped as a cylinder, provided with more than one propping post 411 vertical on the inner lower wall for propping up the motor 4 when the motor 4 is placed inside said base 41 and more than one hooking arm 412 extending upward from the upper edge of said base 41 for hooking down and stabilizing the motor 4.

The revolution of the motor 4 is orderly transmitted through the gear 40, the gear wheel 5, the double gear wheel 6 (or 61 and 62) and finally to the gear wheel 21 in the main winding head 2 to rewind a tape.

When rewinding is finished, the main winding head 2 stops, but the motor 4 is not yet cut off from its power, so therefore, the double gear wheel 6 can turn a little along the edge of the gear wheel 21, caused by the revolutionary force of the motor 4 against the main winding head 2 already stopped. Then this revolutionary force can directly function to move the movable base 1 sidewise with the positioning post 43 as a pivot; thereby the case opening arm 7 can also be moved sidewise and synchroneously. Consequently, the electric power can automatically be turned off and the tape case can be opened at the moment when the videotape has been finished in rewinding.

In short, this mechanical structure for video tape rewinder is considered to have the following advantages.

1. The mechanical power can be transmitted in a stable and steady condition.

2. Performing stabilitY is good and noise very little.

3. The parts can last long with little wear and tear with a resultant long service life.

4. The interrelated engaging movement is correct so that rewinding a tape and transimtting the force for opening the case is performed with certainty.

5. It hardly gets out of order.

I claim:

1. A tape cassette rewinder, comprising:
   (A) a casing for receiving a tape cassette in an open position;

(B) a movable support member pivotably mounted on the casing for movement about a pivot axis between a rewinding position and a rewind-stop position;

(C) drive means mounted on the support member for rewinding the tape cassette in the rewinding position, and for angularly moving the support member about the pivot axis to the rewind-stop position to open the casing when the rewinding is completed, said drive means including (i) a rotary main winding head engageable with the tape cassette and rotatable about a main axis, (ii) an electrically powered motor having an output shaft rotatable about a shaft axis, and (iii) a gear transmission between the shaft and the head for rotating the head about the main axis, said transmission including (a) a motor gear mounted on the shaft and rotatable about the shaft axis, (b) a first gear in meshing engagement with the motor gear and rotatable about a first gear axis, (c) a double gear having a second gear in meshing engagement with the first gear, and a third gear rotatable jointly with the second gear about a second gear axis, (d) a fourth gear mounted on the head and rotatable about the main axis, and (e) said main axis, shaft axis, first gear axis and second gear axis being mutually parallel;

(D) a motor housing mounted on the support member for receiving the motor; and (E) means on the housing for securely holding the motor in place within the housing.

2. The rewinder according to claim 1, wherein the pivot axis and the first gear axis are coincident.

3. The rewinder according to claim 1, wherein the third gear has a smaller diameter than, and is mounted for joint movement with, the second gear.

4. The rewinder according to claim 1, wherein the motor housing is cylindrical and has an inner circumferential wall, and wherein the holding means includes ribs extending parallel to the shaft axis, said ribs being integral with the inner circumferential wall and engaging the motor.

5. The rewinder according to claim 4 wherein the holding means further includes arms extending parallel to the shaft axis above the motor housing, each arm having a hooked end for engaging the motor to stabilize the position of the motor during operation.

* * * * *